Figure 1:
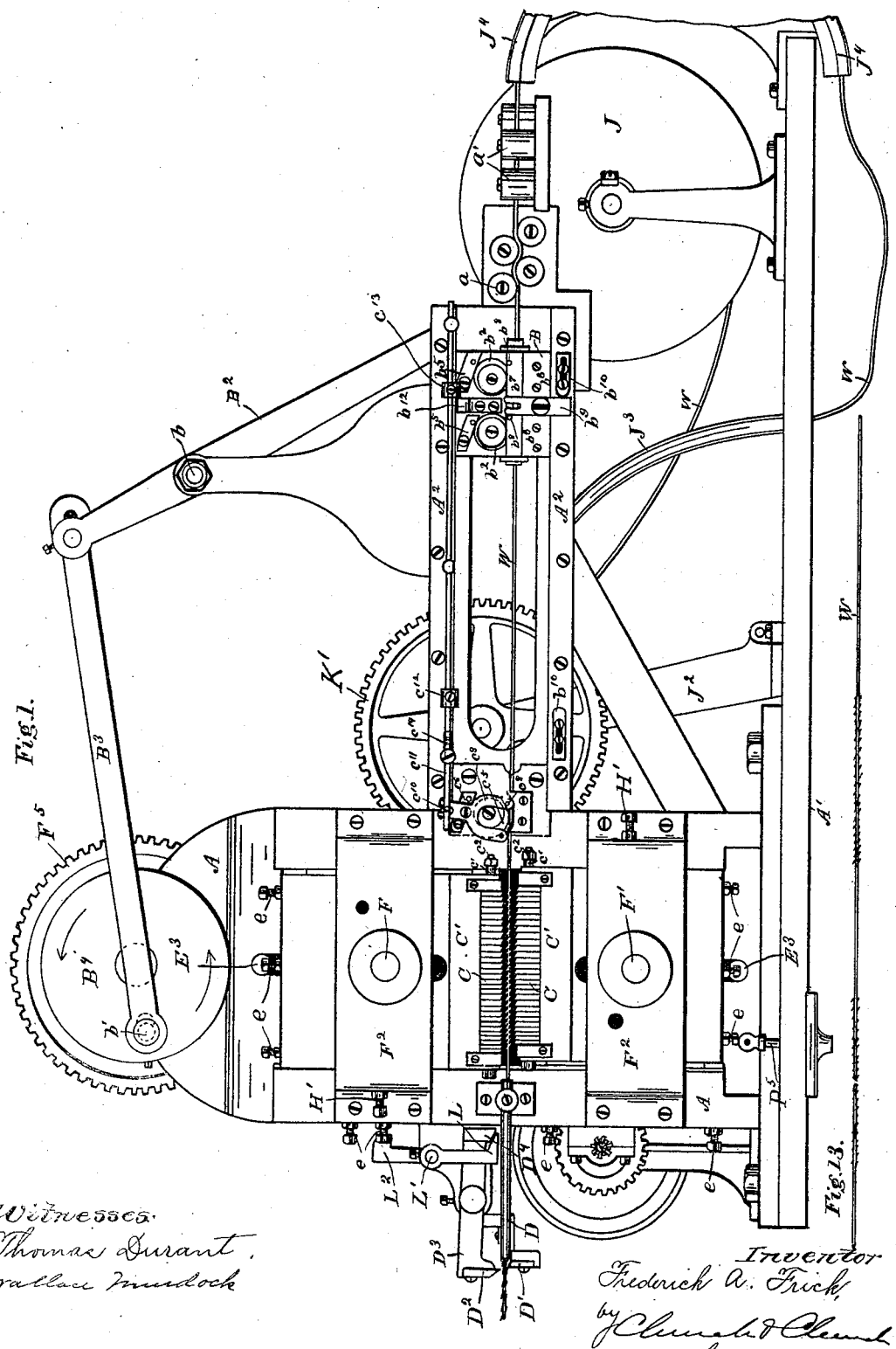

(No Model.) 4 Sheets—Sheet 1.

F. A. FRICK.
MACHINE FOR MAKING BARBS ON WIRE.

No. 581,344. Patented Apr. 27, 1897.

Witnesses:
Thomas Durant
Wallace Murdock

Inventor
Frederick A. Frick,
by Clement & Clement
his Attorneys.

(No Model.) 4 Sheets—Sheet 2.

F. A. FRICK.
MACHINE FOR MAKING BARBS ON WIRE.

No. 581,344. Patented Apr. 27, 1897.

Witnesses:
Thomas Durant
Wallace Murdock

Inventor:
Frederick A. Frick
by Church & Church
his Attorneys.

(No Model.) 4 Sheets—Sheet 3.
F. A. FRICK.
MACHINE FOR MAKING BARBS ON WIRE.
No. 581,344. Patented Apr. 27, 1897.
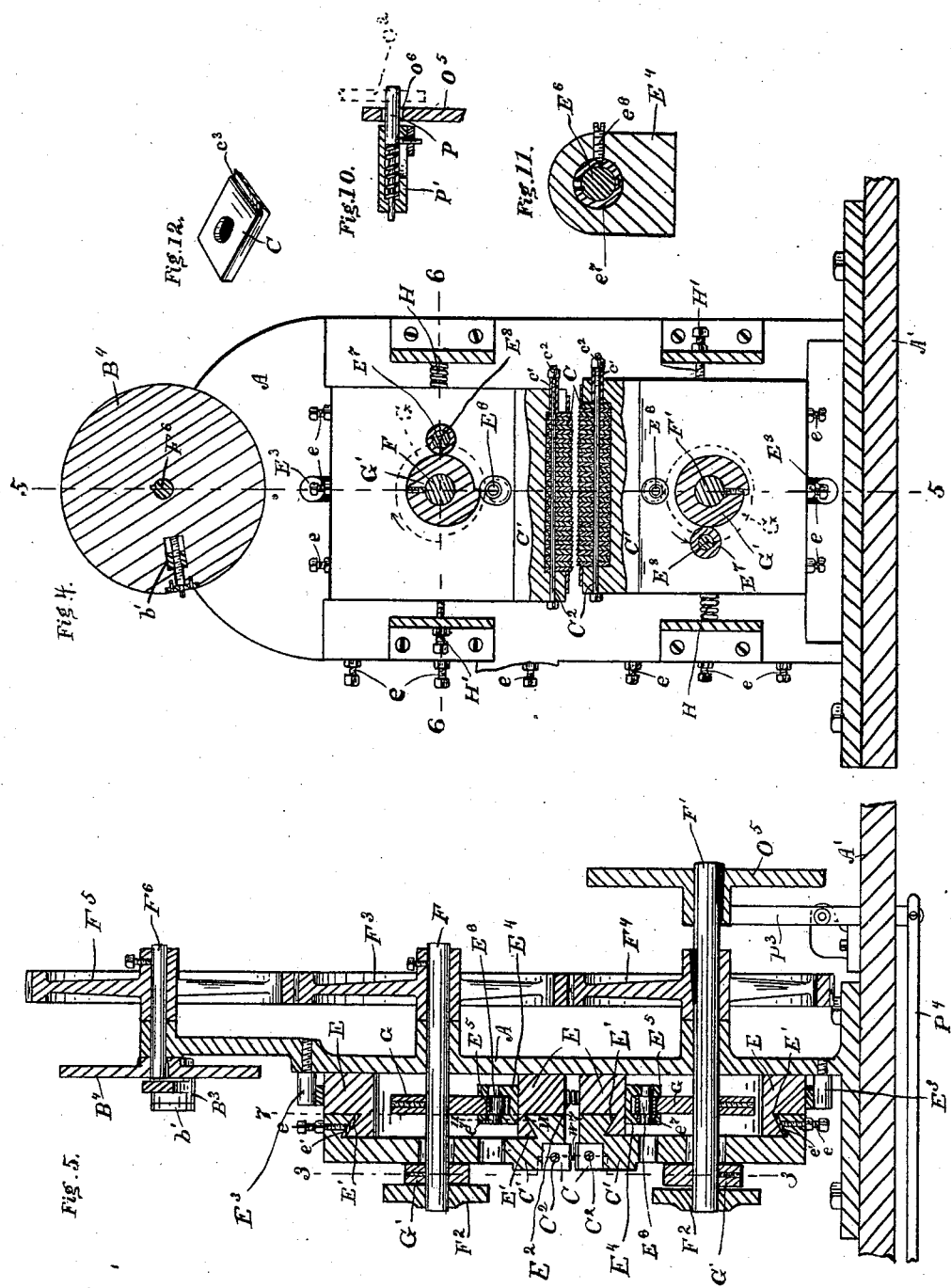
Witnesses:
Thomas Durant
Wallace Murdock
Inventor
Frederick A. Frick
by Church & Church
his Attorneys.

(No Model.) 4 Sheets—Sheet 4.
F. A. FRICK.
MACHINE FOR MAKING BARBS ON WIRE.
No. 581,344. Patented Apr. 27, 1897.
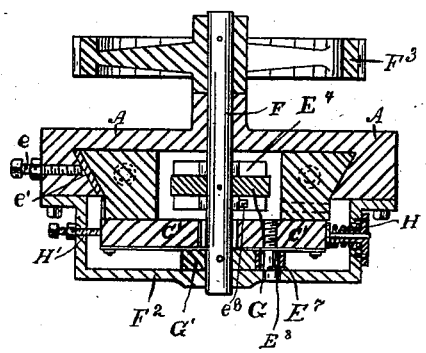
Fig. 6.
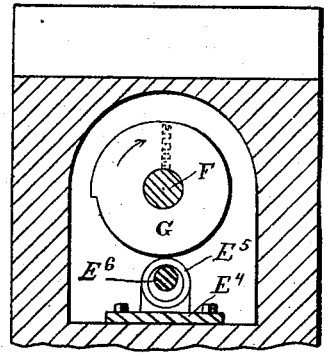
Fig. 7.
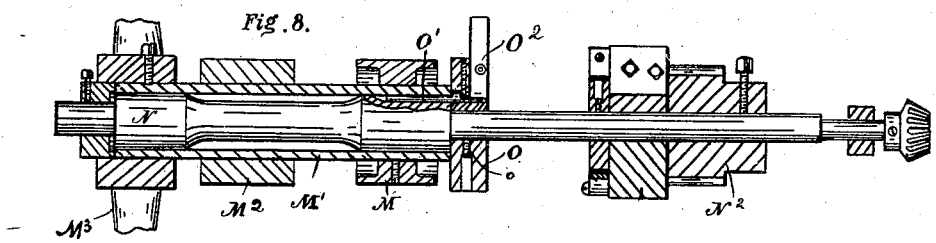
Fig. 8.
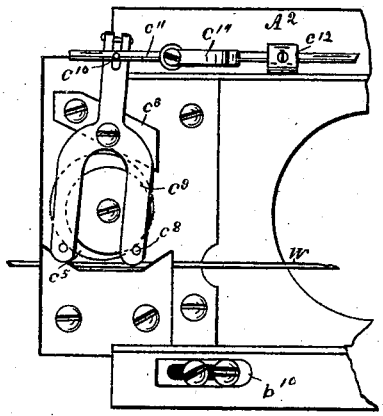
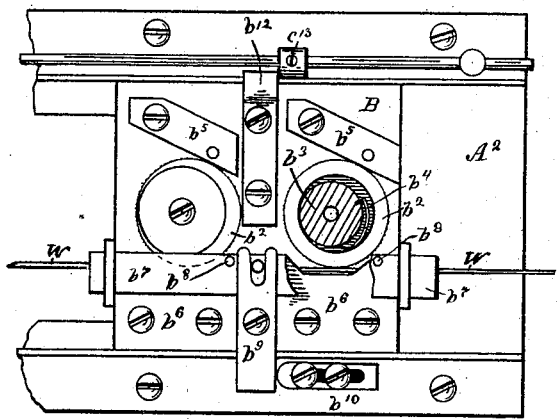
Fig. 9.
Witnesses:
Thomas Durant
Wallace Murdock
Inventor:
Frederick A. Frick,
by
Church & Church
his Attorneys.
THE NORRIS PETERS CO., PHOTO-LITHO., WASHINGTON, D. C.

United States Patent Office.

FREDERICK A. FRICK, OF ROCHESTER, NEW YORK, ASSIGNOR TO THE WILLARD & FRICK MANUFACTURING COMPANY, OF SAME PLACE.

MACHINE FOR MAKING BARBS ON WIRE.

SPECIFICATION forming part of Letters Patent No. 581,344, dated April 27, 1897.

Application filed September 17, 1895. Renewed October 2, 1896. Serial No. 607,722. (No model.)

*To all whom it may concern:*

Be it known that I, FREDERICK A. FRICK, of Rochester, in the county of Monroe and State of New York, have invented certain new and useful Improvements in Wire-Working Machines; and I do hereby declare the following to be a full, clear, and exact description of the same, reference being had to the accompanying drawings, forming a part of this specification, and to the letters of reference marked thereon.

My present invention has for its objects to provide a machine for forming barbs on wire and cutting said wire into suitable lengths for forming tobacco-pipe cleaners, such as contained in my application for Letters Patent, Serial No. 532,567, filed December 21, 1894. The pipe-cleaners referred to consist of a piece of wire having upon opposite ends two series of barbs or projections extending in opposite directions and a covering of fibrous material, such as cotton, held in position by the barbs and prevented from longitudinal movement on the wire when the latter is pushed or pulled through a pipe-stem to clean it. In another application filed simultaneously herewith, Serial No. 562,803, I have shown and described a machine for applying the cotton or fibrous material to the barbed wire, and I have indicated generally in said application a machine similar to the one contained herein, and it will be understood that this is one form and the best of which I am cognizant for barbing or cutting the wire bases for the pipe-cleaners and is adapted to be used in connection with the covering-machine contained in the application last referred to, though it is evident that the wires formed on this machine could be otherwise covered or that the machine could be used for other purposes.

Figure 2:
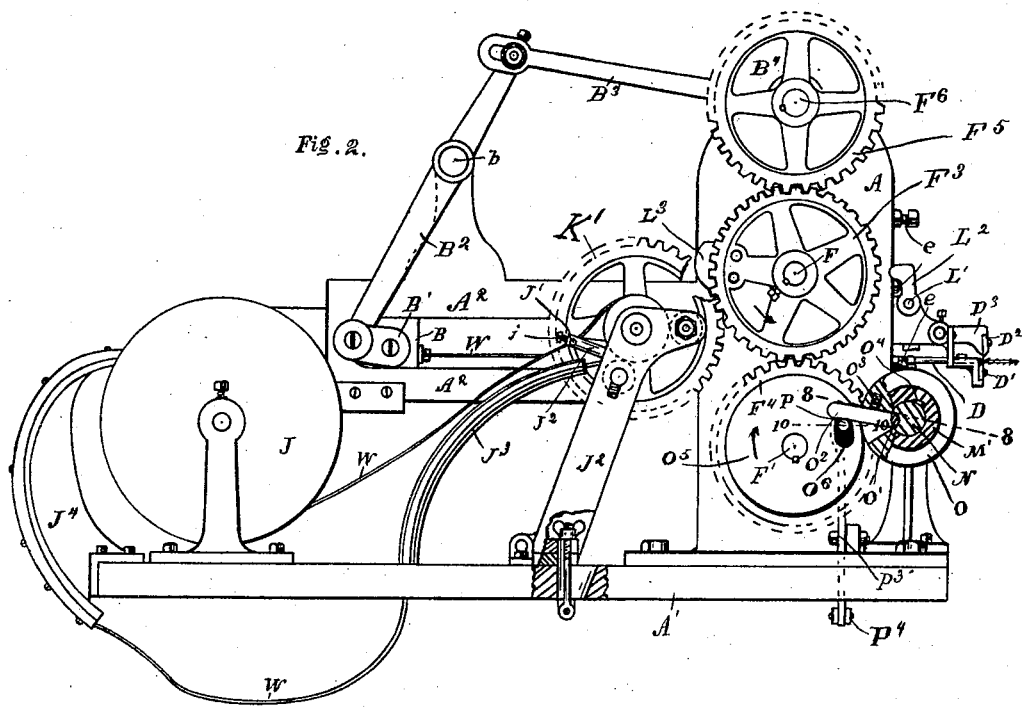
Figure 3:
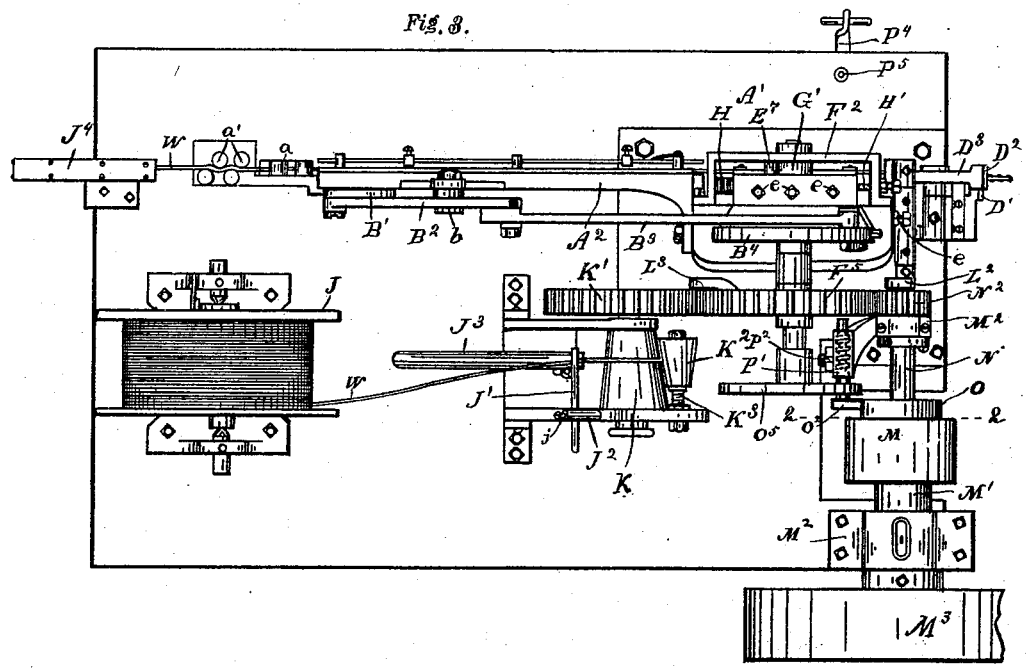

In the drawings, Figure 1 is a front elevation of a machine constructed in accordance with my invention; Fig. 2, a rear view of the same, a part being shown by a section on the line 2 2 of Fig. 3; Fig. 3, a plan view; Fig. 4, a vertical sectional view on the line 3 3 of Fig. 5; Fig. 5, a sectional view taken on the line 5 5 of Fig. 4; Fig. 6, a similar view taken on the line 6 6 of Fig. 4; Fig. 7, a similar view taken on the line 7 7 of Fig. 5; Fig. 8, a similar view taken on the line 8 8 of Fig. 2; Fig. 9, an enlarged view of the wire-feeding devices with a part in section; Fig. 10, a sectional view taken on the line 10 10 of Fig. 2; Fig. 11, a sectional view taken on the line 11 11 of Fig. 5; Fig. 12, a view of one of the barbing-knives removed; Fig. 13, Sheet 1, a view of the wire when barbed and cut.

Similar reference-letters in the several figures indicate similar parts.

A indicates the main frame of the machine, preferably mounted upon the table or support A' and having at one side a guide or way $A^2$, in which operates a wire-feeding slide or carriage B, and at the other end of said way are wire-straightening devices embodying rollers or pins $a\ a'$, of the usual or any preferred construction, through which the wire to be operated upon passes before it is fed between the dies which form the barbs thereon.

The dies for operating upon the wire are each composed, preferably, of a series of removable knives or teeth C, (see Fig. 12,) held in position in the die-blocks C' by bolts $C^2$, having sleeves $c'$ and nuts $c^2$ thereon, as in Fig. 4, and the faces of the teeth C are cut away at $c^3$ for the purpose of enabling the barbs to be more readily turned up on the wire, and the dies are so moved by the devices hereinafter described that they approach each other and move laterally in opposite directions, causing barbs or teeth to be turned up on opposite sides of the wire, as in Fig. 13. On the opposite side of the main frame from the feeding devices is arranged a wire-guide D, through which the wire passes and is guided to a cutter embodying the stationary knife-edge D' and the movable knife $D^2$, mounted on a lever $D^3$, pivoted upon a bracket on the frame.

The wire-feeding devices referred to embody the reciprocating slide or carriage B, connected by a link B' to the end of a lever $B^2$, pivoted at $b$, the other end of the lever being connected by a link $B^3$ with an adjustable wrist-pin $b'$ on a wheel or disk $B^4$. On the front of the slide are arranged two wire-grippers, each consisting of a collar $b^2$, having a roughened edge and surrounding a boss $b^3$, to which is connected a spring $b^4$, frictionally engaging the collar $b^2$ and tending to move it to the right and beneath an incline $b^5$ and clamp the wire W between the collar and a support $b^6$.

$b^7$ indicates a bar sliding in guides on B and having pins $b^8$, which, when the bar is moved to the left, will disengage the grippers $b^2$ from the wire, and $b^9$ is a lever pivoted on the slide and engaging the bar, its lower end being arranged to strike adjustable stops $b^{10}$ on the slide-frame as the slide is reciprocated to permit the engagement and cause the disengagement of the grippers.

$c^5$ indicates a wire-gripper similar to the ones on the slide, located on the stationary frame and coöperating with an incline $c^6$ and released by a pin $c^8$ on a pivoted lever $c^9$, the upper end of the lever being engaged by a pin $c^{10}$ on a sliding rod $c^{11}$, to which are attached stops $c^{12}$ $c^{13}$, adapted to be engaged by a lug $b^{12}$ on the slide. A friction-spring $c^{14}$, pressing on the rod $c^{11}$, prevents accidental movement.

The operation of the wire-feeding device is as follows: When the slide is in the position shown, the grippers upon it are caused by their springs to engage the wire, while the stationary gripper $c^5$ is disengaged by the stop on the lever $c^9$, which latter is moved to the position shown in Fig. 9 by the rod $c^{11}$. As the slide is moved by the lever toward the dies after the barbs have been formed on the wire between them the grippers thereon draw the wire through the straightener and push the barbed portion through the guide D, the movement being sufficient to bring the middle of said barbed portion between the cutters D' D². As soon as the slide B reaches the end of its guide the lug $b^{12}$ engages the stop $c^{12}$, moves the rod $c^{11}$, permitting the engagement of the gripper $c^5$ with the wire, and the lever $b^9$, engaging the stop $b^{10}$, disengages the grippers on the slide from the wire, thereby allowing the slide to move back while the wire is held. The cutter is operated to sever the wire, and the barbing-dies are operated while the slide is moving outward.

Various mechanisms may be employed to cause the operations described, but in the present embodiment of my invention the die-blocks C' are arranged to slide laterally upon suitable ways E' E', formed on the front of slides E E, movable in vertical ways formed in the front of the main frame, as shown particularly in Figs. 5 and 6, adjusting screws and plates e e' being provided for taking up any lost motion between the blocks and slides and the slides and main frame. The slides E E are each provided with a large central recess through which pass the shafts F F', journaled in the main frame and also in yoke-brackets F² F², and upon said shafts are arranged intermeshing gears F³ F⁴ for operating them simultaneously, the upper gear F³ meshing with a gear F⁵ on the shaft F⁶, carrying the disk B⁴.

Arranged between the slides E E are one or more springs E², tending to separate them, and their outward movements are limited by stops E³, while within their central recesses are brackets E⁴ E⁴, carrying rollers E⁵ E⁵ on eccentric-pins E⁶ E⁶, the bracket in the lower slide being located on the upper side of the recess and the one in the upper slide in the lower side thereof, and upon the shafts F F' are cams G G, (shown in Figs. 4, 5, and 7,) against which the cams on the slides are held by the springs E², said cams operating to cause the approach of the slides at certain times. Also arranged upon the shafts F F' are cams G' G', coöperating with rollers E⁷ E⁷ on studs E⁸ E⁸, arranged on the fronts of the die-blocks C' C' and on opposite sides of the shafts, as in Fig. 4, said die-blocks being moved laterally on the slides E, but in opposite directions, by the springs H H, while their movement is limited by adjusting-screws H' H', these springs serving to keep the rollers on the blocks in engagement with the cams. The cams and their operating-rollers are so relatively timed and arranged that as the shafts revolve in opposite directions the cams G will cause the approach of the slides until the teeth of the dies engage the wire between them, and then the cams G' will cause the lateral movements of the die-blocks C' on the slides in opposite directions, the teeth of the dies turning up the barbs on the wire as previously described. It will be understood that at the same time the dies are also moved together by the cams G to cause the proper-shaped barbs to be turned out on the wire. The eccentric-pins E⁶ E⁶ may be rotated to vary the amount of the movement of the slides, and are secured in adjusted position by small screws $e^6$ in the brackets E⁴, which operate against the split spring-sleeve $e^7$, said sleeve being clamped to the pin and held by the screw $e^6$ entering a depression in the side, as shown in Fig. 11.

In a machine of this class instead of drawing the wire directly from the reel containing it it is desirable to provide a sufficient amount of slack wire to be taken up at each reciprocation of the feeding device, and with this idea in view and also of providing for the unwinding of the proper amount from the reel I provide a loosely-supported wire-reel J upon the base A', from which the wire extends through an aperture in a guide-pin J', secured to a support J² by a small screw $j$, and mounted upon said support is a shaft having a conical friction driving-pulley K thereon and a gear K', meshing with the gear F³.

K² indicates a small cone-pulley mounted upon a stud K³ on the support J², and the wire W from the reel extends through the guide J' around the cone-pulley K, against which it is held by the idler-cone K², then through a guide J³, preferably beneath the table, thence through a guide J⁴ to the wire-straightener before described. As the pulley K is positively driven the wire is drawn off the reel in just sufficient quantity to provide the necessary slack, and this quantity may be adjusted by moving the guide J' in or out, directing the wire to the larger or smaller part of the cone-pulley, as may be desired, to feed more or less at each revolution thereof.

The lever $D^3$, which carries the wire-cutter $D^2$, has a forward extension $D^4$, beneath which projects the inclined end of an arm L, connected to a rock-shaft L', journaled in a bracket on the frame, the rear end of said shaft having an arm $L^2$, adapted to be engaged by a cam $L^3$, connected to the gear $F^3$, the relation of the latter to the die-block-actuating device being such that the wire will be severed after the wire-feed slide has completed the feeding movement.

The means for driving the machine and arresting the parts when desired with the dies separated is shown particularly in Figs. 3, 5, 8, and 10.

M indicates a belt-driving pulley secured to a sleeve M', supported in a suitable bearing $M^2$, and $M^3$ indicates a fly-wheel on said sleeve.

N is a shaft within the sleeve, but normally unconnected therewith, its outer end being supported in a bearing and having a pinion $N^2$ thereon meshing with the gear $F^4$, and between the shaft and sleeve is a clutch device for connecting them when desired. This clutch may be of any description, but preferably consists of a disk O, connected to the shaft by a screw $o$, and is provided with a half-round latch-piece O', fitting in a groove in the shaft and shaped so that when turned to the position shown in Fig. 2 the shaft and sleeve are unconnected, and it is provided with an arm $O^2$, operated upon by a spring $O^3$, the tendency of which is to turn the latch so as to cause its edge to engage with a notch $O^4$, formed in the inner side of the sleeve, and cause the shaft to be operated thereby.

Mounted upon the shaft F' of the machine is a disk $O^5$, having an aperture $O^6$, through which is adapted to be projected a bolt P, mounted in a socket in a stationary arm P' and having a pin $P^2$, with which engages a lever $P^3$, pivoted to an actuating-rod $P^4$, adapted to be secured by a pin $P^5$, passing through the table A'.

The driving sleeve or shaft is constantly rotated, and when the machine is not being operated the bolt P projects through the aperture in the disk $O^5$ and engages the arm of the latch, holding the latter out of engagement.

In order to start the machine, it is only necessary to retract the bolt P from the aperture in the disk and the latch-arm holding it by the pin $P^5$, which engages the rod $P^4$, and the spring $O^3$, turning the latch, will cause the engagement of the shaft and sleeve. The disk, the bolt, and the latch-arm are so relatively arranged as to size and rotation that the bolt may be released when it is desired to stop the machine, and it will be pressed by its spring against the face of the disk and when the aperture comes in line will pass through and engage the latch-arm, thereby disengaging the clutch and automatically stopping the machine with the die-carriers separated.

It will be understood that by reason of the fact that the dies operate on the wire between them and move toward and laterally of each other there is no tendency to cause the displacement of the wire or to unduly crush or change its shape other than to turn up the barbs properly, and while the means shown for causing the required movements of the dies is the best that I am at present familiar with I do not wish to be confined to this.

The wires barbed and cut by this machine may be sold to consumers, who can form the pipe-cleaners by winding cotton or other similar material around the barbed portion and remove it after use by burning it off, for instance, but the wires for the cleaners are made by this machine cheaply and rapidly and are adapted to be used but once and then thrown away.

I claim as my invention—

1. In a machine for barbing wire, the combination of two toothed dies arranged to operate upon wire between them, and actuating mechanism moving said dies relatively toward and from and laterally of each other, substantially as described.

2. In a machine for barbing wire, the combination of two toothed dies arranged to operate upon wire between them, and actuating mechanism moving the dies relatively toward and from and laterally of each other, a wire-feeding device, and a cutter, substantially as described.

3. In a wire-working machine, the combination of a wire-feeder, a cutter, and cutting-dies for forming barbs on the wire located between the feeder and cutter, substantially as described.

4. In a wire-working machine, the combination of a wire-feeder, intermittingly-operating cutting-dies for forming a series of barbs on the wire, and a cutter for severing the wire in the middle of a series of barbs thereon, substantially as described.

5. In a wire-working machine, the combination of a wire-feeder, intermittingly-operating barb-cutting dies relatively movable toward and laterally of each other, and a cutter, substantially as described.

6. In a wire-working machine, the combination of intermittingly-operating barb-cutting dies relatively movable toward and laterally of each other, an intermittingly-operating wire-feeder, and an intermittingly-operating wire-cutter, said devices arranged and operating to feed and cut the wire intermediate of the ends of the series of barbs formed by the barb-cutting dies, substantially as described.

7. In a wire-working machine, the combination with the intermittingly-operating dies for operating upon the wire between them, and a wire-cutter, of wire feeding and holding devices, embodying the slide having grippers thereon, a stationary wire-gripper, and connections between the grippers for engaging and disengaging them as the slide is moved in opposite directions, substantially as described.

8. In a wire-working machine, the combination with the main frame having guides, the slide movable therein, and having guides at an angle to those on which it moves, the die-block movable in the guides on the slide, and the die having cutting-teeth, of the actuating devices for moving the slide and also moving the die-block relative thereto, substantially as described.

9. In a wire-working machine, the combination with the main frame having two guides, the two slides thereon, each having guides at right angles to those in which they move, and the two die-blocks movable in the guides in the slides, each having one of a pair of coöperating dies, of actuating devices, for causing the approach of the slides and the lateral movements in opposite directions of the die-blocks thereon, substantially as described.

10. The combination with the main frame having the way thereon, the slide movable in the way, and the ways and the roller on the slide, the die-block movable in the ways on the slide, and the die and the roller thereon, of the shaft and the two cams thereon, one operating the slide and the other the die-block, substantially as described.

11. The combination with the main frame having ways thereon, the two slides movable in said ways, each having ways and the roller, the die-blocks movable in the ways on the slide, each having a die and a roller thereon, of the two shafts, each having a cam for operating the slides toward each other, and a cam for operating the die-blocks in opposite directions relatively, substantially as described.

12. In a wire-feeder, the combination of a stationary wire-gripper, and a movable portion, having a wire-gripper thereon, and connections between the movable portion and the stationary wire-gripper embodying stops engaged by the latter at the ends of its movements, whereby the engagement and disengagement of the stationary gripper will be accomplished, substantially as described.

13. As a means for feeding wire, the combination with a frame, and a stationary wire-gripper, of a movable portion, having a wire-gripper thereon, connections between the movable portion and the stationary gripper embodying stops engaged by the movable portion for causing the operations of the latter, and the stops on the frame for engaging and causing the operations of the gripper on the slide, substantially as described.

14. In a wire-working machine, the combination with the wire-reel, and constantly-operating rollers for withdrawing the wire therefrom, of intermittingly-actuated devices for operating on the wire, and an intermittingly-operating wire-feeder arranged between the devices operating on the wire and the rollers, substantially as described.

15. In a wire-working machine, the combination with a wire-reel, and a pair of conical rollers for withdrawing the wire from the reel, of an adjustable guide for directing the wire from the reel to the rollers, substantially as described.

16. The combination with the barbing-dies, wire-feeding mechanism, a wire-cutter, and operating mechanism therefor, of a driving-shaft, a clutch device between it and the operating mechanism, and a wheel or disk controlling the clutch device and operating to cause the arrest of the machine with the dies separated, substantially as described.

17. A die for barbing wire, composed of a series of separate knives, each having the inclined face and the undercut side, and a block for holding said knives, substantially as shown and described.

18. The combination with the main frame, the die-blocks, and dies movable toward and laterally of each other, of the two shafts having the intermeshing gears and devices for causing the movements of the dies, the wire-cutter, and a cam carried by one of the gears for actuating the cutter at predetermined intervals, substantially as described.

FREDERICK A. FRICK.

Witnesses:
R. P. SPOONER,
JACOB STROBEL.